United States Patent
Kliemannel et al.

(10) Patent No.: US 8,485,061 B2
(45) Date of Patent: Jul. 16, 2013

(54) OPERATING DEVICE WITH SELECTOR LEVER RETURN

(75) Inventors: Wolfgang Kliemannel, Lemförde (DE); Ludger Rake, Diepholz (DE); Sascha Rosentreter, Espelkamp (DE); Harald Merklein, Wettstetten (DE); Andreas Giefer, Lemförde (DE)

(73) Assignees: SF Friedrichshafen AG, Friedrichshafen (DE); Audi AG, Neckarsulm (DE)

( * ) Notice: Subject to any disclaimer, the term of this patent is extended or adjusted under 35 U.S.C. 154(b) by 674 days.

(21) Appl. No.: 12/531,941

(22) PCT Filed: Mar. 10, 2008

(86) PCT No.: PCT/DE2008/050005
§ 371 (c)(1),
(2), (4) Date: Sep. 28, 2009

(87) PCT Pub. No.: WO2008/116461
PCT Pub. Date: Oct. 2, 2008

(65) Prior Publication Data
US 2010/0071506 A1      Mar. 25, 2010

(30) Foreign Application Priority Data
Mar. 28, 2007   (DE) .................... 10 2007 015 375

(51) Int. Cl.
*F16H 59/08* (2006.01)
(52) U.S. Cl.
USPC .................... 74/473.23; 74/473.28; 74/473.33
(58) Field of Classification Search
USPC ............... 74/473.21, 473.23, 473.27, 473.33, 74/473.28
See application file for complete search history.

(56) References Cited

U.S. PATENT DOCUMENTS

| | | | |
|---|---|---|---|
| 6,298,742 B1 * | 10/2001 | Ey ............................... | 74/473.23 |
| 6,684,730 B2 | 2/2004 | Giefer et al. | |
| 7,784,375 B2 * | 8/2010 | Bleckmann et al. ........ | 74/473.23 |
| 7,832,302 B2 * | 11/2010 | Wang ......................... | 74/473.23 |
| 2007/0034041 A1 | 2/2007 | Dominguis Botella et al. | |

FOREIGN PATENT DOCUMENTS

| | | |
|---|---|---|
| DE | 197 33 206 C1 | 10/1998 |
| DE | 100 05 328 A1 | 8/2001 |
| DE | 10 2004 034 559 A1 | 2/2006 |
| DE | 10 2005 053 610 A1 | 5/2007 |
| DE | 10 2007 007 667 A1 | 8/2008 |
| EP | 1 752 688 A1 | 2/2007 |
| WO | 2006/007942 A1 | 1/2006 |
| WO | 2008/098895 A1 | 8/2008 |
| WO | 2008/116437 A1 | 10/2008 |

* cited by examiner

*Primary Examiner* — William C Joyce
(74) *Attorney, Agent, or Firm* — Davis & Bujold, PLLC

(57) ABSTRACT

An operating device for selecting shift stages in a shift-by-wire gearbox. The device comprises a selector lever which is movable between a drive gear position and a park position, and a locking device with a spring-loaded detent pin and a lock-in gate. An actuator device, that moves the selector lever, comprises a disengagement device. A detent pin and a lock-in gate can be brought, via a disengagement device, from a first relative position, in which the detent pin engages a shifting track of the lock-in gate, into another relative position, in which the detent pin disengages the shifting track. The operating device facilitates simple and safe actuator-induced return of the selector lever, into the park position, and offers the driver reliable optic and tactile feedback about the actual shift condition of the transmission.

11 Claims, 5 Drawing Sheets

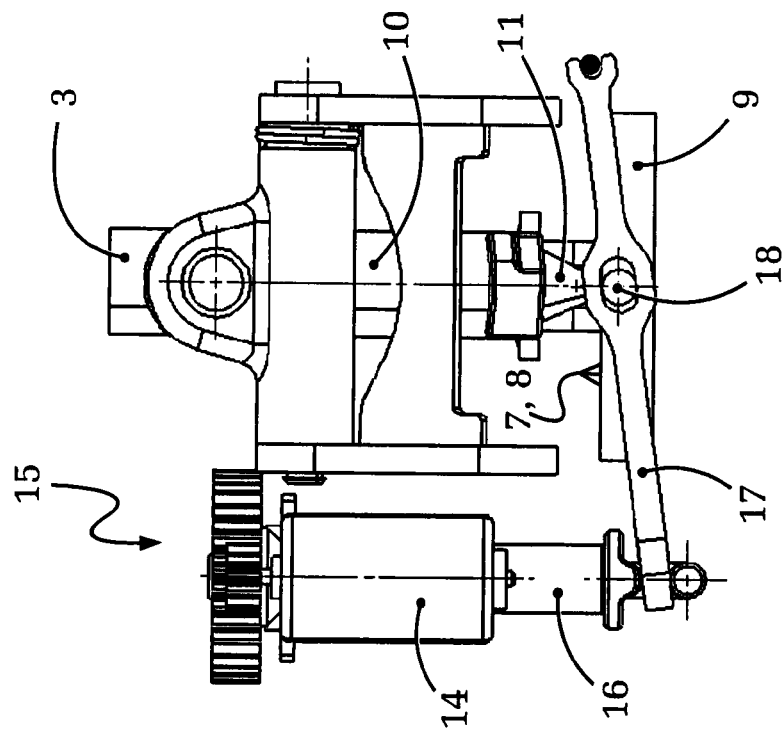
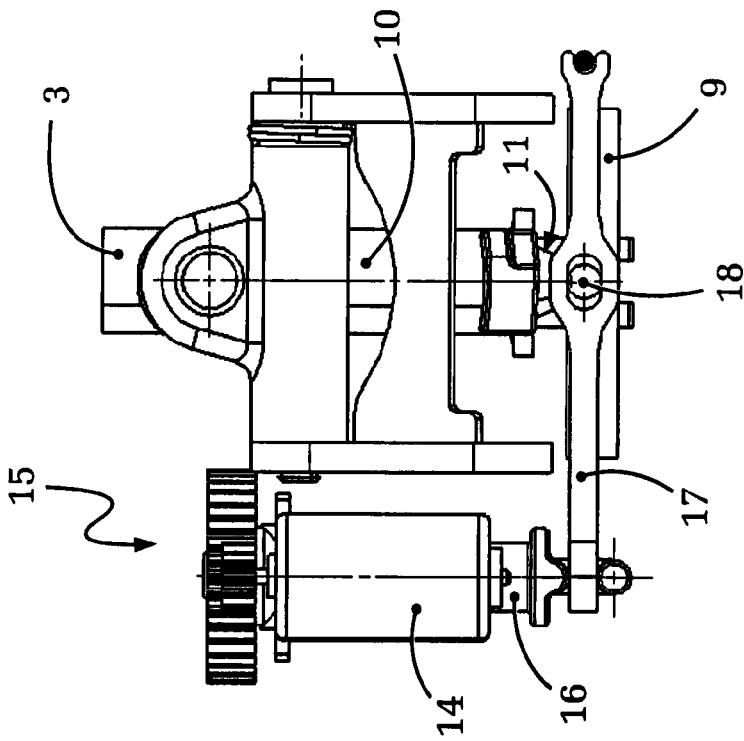

OPERATING DEVICE WITH SELECTOR LEVER RETURN

This application is a National Stage completion of PCT/DE2008/050005 filed Mar. 10, 2008, which claims priority from German patent application no. 10 2007 015 375.0 filed Mar. 28, 2007.

FIELD OF THE INVENTION

The invention relates to an actuating device with selector lever return for a gearshift, in particular an automatic transmission with shift-by-wire actuation.

BACKGROUND OF THE INVENTION

Vehicle gearboxes are usually controlled or shifted by an actuating device within the driver's area of reach. Operating elements like a gearshift or a selector lever are positioned, for example, between the front seats are regularly used.

The constructional and ergonomic requirements for such actuating devices or selector levers are thereby numerous. In order, for example, to give the driver a realistic feeling for transmission operation for reasons of safety and ergonomics, it is required of actuating devices of this type that both optical as well as clearly haptic or tactile feedback is sent to the driver. The driver should be expected to infer during operation of the shift selector level the shifting procedure actually occurring in the transmission from this. It should also be possible for the driver to be able to determine intuitively by a look or grasping of the selector lever the shifting status at the moment.

It is thus desirable to impart to the driver a clear optical and haptic feedback about the current state of the transmission or the driving gear actually engaged based on the momentary position or angular position of the selector lever.

In the case of mechanical transmission actuation or a mechanical clutch between the selector lever and the gearshift—for example by means of a cable pull or a linkage—the selector lever position always agrees with the actual gear position because of the mechanical clutch. Since mechanically operated gearshifts are in general multi-stable (the gear shift position is stable in several or all positions and does not change independently), the associated selector lever is also multi-stable and this always remains in the position set by the driver.

As a result, the driver can, on the one hand, conclude from the respective selector lever position the actual shift status of the gearbox or recognize, based on the selector lever position, the gear respectively engaged in the transmission and, on the other hand, rely on the fact that the selector lever position will not deviate from the actual shift status of the gearbox.

In the case of the increasingly used electric actuation or the shift-by-wire operation of the gearbox, no mechanical clutch exists anymore between the actuating device or the selector lever in the passenger compartment and the vehicle transmission in the motor area. Moreover, the transmission of shifting commands from the actuating device to the vehicle transmission occurs in the case of "shift-by-wire" transmission almost exclusively by means of electrical or electronic signals, and thereafter an almost electro-hydraulic conversion of the shift commands. That partially applies for modern gearboxes, especially for the current generations of automatic transmissions which are almost completely remotely controlled by actuators.

In the case of a shift-by-wire operated gearbox, the missing mechanical connection between the gearbox actuators and the selector lever can, however, result in the selector lever position no longer matching the shift status of the gearbox under certain framework conditions or in the case of error.

Thus modern automatic transmissions feature a so-called auto-P function which ensures that when leaving the vehicle, the parking lock is always engaged in the transmission in order to prevent a rolling away of the unattended vehicle. The auto-P function which goes into action, for example, when the ignition key is withdrawn or upon leaving the vehicle, in other words ensures the automatic setting of the parking lock in the transmission independent of the actual drive gear selected on the selector lever. The parking lock is also then set by the auto-P function of the transmission or the vehicle, when the selector lever is actually left by the driver in the neutral position or in another drive gear position.

In this case, the selector lever position no longer agrees with the actual shift status of the transmission. Upon returning to the vehicle or when attempting to start the vehicle, both unsatisfactory optical as well as haptic information is conveyed to the driver. Once the selector lever position is recognized, the driver assumes that the transmission is, for example, in the neutral position or in a drive gear position, while the transmission, on the other hand, actually has the parking lock set. This discrepancy between the selector lever position and the transmission status can thus result in an undesired faulty operation, in improper inferences by the driver and thus also to situations critical to safety; or else an additional signal device must be provided for the driver which signals the driver in the case of the parking block set by the auto-P that the vehicle must first be started, if the selector lever is manually brought into the park position.

An attempt was made to so counter the stated problem in that the selector lever of a shift-by-wire gearbox has been constructed as a mono-stable actuating device. In other words, this means such a selector lever constructed in a mono-stable manner always returns to the same middle position after each operation. In connection with a mono-stable selector lever, the feedback about the actual shift status of the gearbox remains exclusively entrusted to a separate display, for example, by means of light diodes. On the other hand, with a mono-stable selector lever, the possibility of conveying to the driver either optic or haptic feedback about the shift status of the gearbox is lacking. Furthermore, the realization of the mechanical shift logic and the necessary shift locks, like for example the so-called key-lock and shift-lock locks, are at least difficult with a mono-stable selector lever and require expensive actuators for the selective blockage of the selector lever.

The safety function known as the so-called key-lock system results, for example, in a blockage of the selector lever in the position "P" of an automatic transmission, so long as the ignition key is removed.

Thus with actuating devices having a mechanical clutch to the gearshift, unintended actuation of the selector lever when the ignition key is removed or the ignition is shut off is prevented, and therewith unintended disengagement of the parking lock in the gearbox, due to which the vehicle could be unintentionally placed in motion.

The shift-lock system represents another example of such a safety function which ensures that shifting out of the "P" or "N" shift position is only possible for safety reasons when the brake pedal is depressed. It also serves the purpose of preventing uncontrolled starting of the vehicle at the moment a drive gear is engaged.

The known, mono-stably constructed, actuating devices also have the disadvantage that the driver must get acquainted with a new operating concept involving a lever that always returns to the center position, whereby this operating concept differs greatly from traditional transmission operation. Furthermore, such mono-stable actuating devices comprise in general a variety of actuators for the selective blockage of unauthorized shift commands depending on the driving condition of the vehicle, which is expensive to construct and entails the corresponding costs.

SUMMARY OF THE INVENTION

Against this background, it is the object of this invention to create an actuating device for a gearbox with which the named disadvantages present in the state of the art can be overcome. The invention should thereby facilitate that even in shift-by-wire transmissions, the selector lever always reflects the actual shift status of the gearbox, owing to which reliable optic and haptic feedback can be realized about the actual shift condition of the transmission. That the selector lever remains in one of the drive gear positions in the event of an automatically engaged parking lock is particularly to be avoided, while the parking lock is, on the other hand, actually engaged in the gearbox. The actuating device should be constructed comparatively simply and economically while being robust at the same time.

The actuating device according to the present invention comprises in a manner known by itself as a selector lever—having at least one shift track—and a locking device with a detent pin whose detent pin tip is guided by spring loading into a lock-in gate. Moreover, the shift selector lever is constructed in the traditional operating concept as a multi-stable actuating device with stable selector lever positions.

The actuating device of the invention is characterized by an actuator device to actuate movement of the selector lever, in particular for independent return of the selector lever into the park position in the event of auto-P. The actuator device thereby exhibits an actuator-driven disengagement device, for example by electric motor or electromagnetically. By means of the disengagement device, the detent pin and the lock-in gate can be brought by the actuator from a first relative position to another relative position. In the first relative position the detent pin engages and maintains contact in a locking track of the lock-in gate provided with locking recesses which represents the normal operation of the actuating device with a corresponding locking of the selector lever in the individual selector lever positions. In the other relative position, however—which serves the easy moving, automatic return of the selector lever, especially into the park position—the detent pin is not engaged with the locking track of the lock-in gate.

In other words, this means that the contact maintained by the detent pin in the lock-in gate which is present during normal operation can be eliminated thanks to the actuator device of the invention with the disengagement device. Accordingly, the selector lever can be easily and, if necessary, independently set into motion, whereby the selector lever can in particular be returned from each position or each gear track into the park position. The latter can occur, for example, by means of spring power, since the reaction forces of the detent pin in the lock-in gate braking the selector lever are eliminated thanks to the inventive disengagement device.

Thus in the event that the vehicle driver neglected, for example, to manually engage the parking lock when shutting off the vehicle, then—in a shift-by-wire transmission—the parking lock would automatically be engaged by the gearbox control after the ignition key was removed or after the vehicle was abandoned. Furthermore, the selector lever is automatically brought from the last engaged driving gear position or tip track position to the park position—by means of the use of the inventive actuator device and, for example, a return spring, so that the actual shift status of the transmission finally again matches the position of the selector lever. In this way there is correct feedback to the vehicle driver about the set parking lock, especially in the case of the parking lock automatically set with the use the auto-P function by means of the gearshift.

For the realization of the invention, it is first of all not decisive how the actuator device is constructed and in which manner the disengagement device brings the detent pin out of contact with the lock-in gate. According to an especially preferred embodiment of the invention, the disengagement device of the actuator device is constructed, however, as a device for the actuator-caused movement of the lock-in gate relative to the housing base of the actuating device. This is advantageous to the extent that here no comparatively expensive actuator is positioned on the selector lever itself or is connected with the selector lever. Moreover, in this manner, the release of the independent return movement of the selector lever into the park position occurs indirectly by means of the corresponding movement away of the lock-in gate out of the engagement area of the detent pin in the lock-in gate.

The disengagement device in another embodiment of the invention is constructed as a device for a movement away of the lock-in gate basically along the spring-force direction of the detent pin impacted by the spring-force. In other words, this means that in this embodiment the detent pin and lock-in gate are so brought out of contact that the lock-in gate is moved away from the detent pin basically in a linear or arc shape—in the direction of the spring force of the locking pin. As soon as the lock-in gate has reached a sufficient distance in this manner from the spring-loaded tip of the detent pin, the independent return of the selector lever occurs especially into the park position, for example by means of a spring energy store acting on the selector lever.

According to another alternative embodiment of the invention, the disengagement device for the actuator-caused movement of the lock-in gate is basically constructed vertically to the spring force direction of the detent pin. This embodiment is advantageous in that, in this way, the position of the detent pin or the detent pin tip in the lock-in gate can be specifically changed by means of an essentially straight line or, for example, an arc-shaped movement of the lock-in gate relative to the detent pin. The detent pin can in particular be brought by the actuator into another shifting track of the lock-in gate by means of an appropriate displacement of the lock-in gate. The defined return of the selector lever can then occur into the park position in this other shifting track of the lock-in gate, for example, by means of a spring energy store acting on the selector lever.

Against this background, it is provided that, in an especially preferred embodiment of the invention, the lock-in gate exhibits a return track for a defined return of the detent pin—and thus also the selector lever—into the park position. Thanks to the return track—which preferably is constructed smoothly, thus exhibiting no locking depressions braking the detent pin—there is a defined and easy moving path for the return of the detent pin or the selector lever supported, for example, by spring force.

According to another preferred embodiment of the invention, the return track is constructed as an inclined plane, whereby the gradients of the inclined plane run in the direction of the park position of the detent pin. In this way, an especially simple and robust, independent return of the detent pin and thus the selector lever can be realized, even without additional components being required on the selector lever. Even a spring energy store for returning the selector lever into the park position can be omitted, since the interaction of the return track constructed as an inclined plane with the spring-loaded detent pin tip ensures that the detent pin and thus the selector lever slide independently along the gradients of the return track in the direction of the park position.

Another embodiment of the invention provides that the lock-in gate is linearly movable back and forth by means of the disengagement device between an operating position and a return position. Thanks to this embodiment, there can be a simple and reliable alternating between an operating position and a return position of the disengagement device, whereby the detent pin tip is located in a shifting track of the lock-in gate in the operating position of the disengagement device, while the detent pin tip is located in the return track of the lock-in gate when in the return position of the disengagement device. In this embodiment a shifting track and a return track can be located by means of a simple construction on the surface of the lock-in gate, for example, next to each other.

It is provided in another alternative embodiment of the invention the lock-in gate can be rotated back and forth between an operating position and a return position by means of the disengagement device. In this embodiment, there is an especially simply constructed and robust realization of the required movable guide of the lock-in gate in the housing base of the actuating device. Thanks to this embodiment, the lock-in gate can be located on a pivot pin positioned on the housing base, while the shifting track and the return track can be positioned, for example, along or in the vicinity of two radii of the lock-in gate in relation to the pivot pin. If the shifting track and the return track are positioned in such a way in the vicinity of two radii on the lock-in gate, then the transfer of the detent pin tip occurs between the shifting track and the return track, in particular at the intersection of the shifting track and the return track, namely in the area of the pivot point of the lock-in gate.

According to another preferred embodiment of the invention, the lock-in gate exhibits another guide constructed as a locking track or a receptacle for the detent pin tip. The locking track thereby serves to lock the receptacle of the detent pin, in particular for the purpose of locking the selector lever in a certain selector lever position.

In this way, the lock-in gate can be set not only for locking as well as also for a defined, active return of the selector lever but can also be advantageously constructed, for example, to lock the selector lever in the park position.

The latter is significant in particular with the above described safety interlocks, namely Key-lock and Shift-lock, which ensure that the selector lever can only be moved out of the park position after turning on the ignition and/or activation of the brake pedal.

For a complete locking of the detent pin in the locking track of the lock-in gate, the lock-in gate can, for example, be moved further—after the detent pin is brought into the locking track by an actuator or spring power—for example, be further swiveled or twisted, until a form lock between the lock-in gate, selector lever, and housing base exists because of the interaction of the locking track and the selector lever guide and completely enclosures the detent pin tip.

The locking track on the surface of the lock-in gate preferably represents a branch of the shifting track, whereby there results a simple entry of the detent pin from the shifting track into the locking track, and thus a simple change of gears between normal operation (detent pin in the shifting track) and blockage of the selector lever (detent pin in the locking track).

According to another embodiment of the invention, it is finally provided that the disengagement device comprises a sliding block guide for the selector lever. Thanks to this embodiment, there is a constructionally advantageous, multiple use of a sliding block guide available in the disengagement device for the selector lever.

On the one hand, during operation of the actuating device, the sliding block guide can represent defined guiding of the selector lever in the authorized shift tracks and, on the other hand, a transfer of the actuator forces can occur to the selector lever by means of an actuator-moved sliding block guide. In this manner, the selector lever can be moved by the actuator between various shift tracks or it can so act on the selector lever by means of the sliding block guide that the detent pin tip is forced out of the shifting track of the lock-in gate, for example, into the return track of the lock-in gate.

In addition, thanks to this embodiment, a complete blocking of the detent pin tip in the locking track of the lock-in gate occurs in which the sliding block guide is moved so far by the actuator that the detent pin is enclosed all around in a form-lock because of the interaction of the sliding block guide and the locking track.

BRIEF DESCRIPTION OF THE DRAWINGS

In the following the invention is explained in more detail using drawings showing embodiments, wherein:

FIG. 7 is a representation and view according to FIG. 1 of another embodiment of an inventive actuating device with a disengagement device in the operating position;

FIG. 8 is a representation and view according to FIGS. 1 and 7 of the actuating device of FIG. 7 with a disengagement device in the return position;

DETAILED DESCRIPTION OF THE PREFERRED EMBODIMENTS

Figure 1:
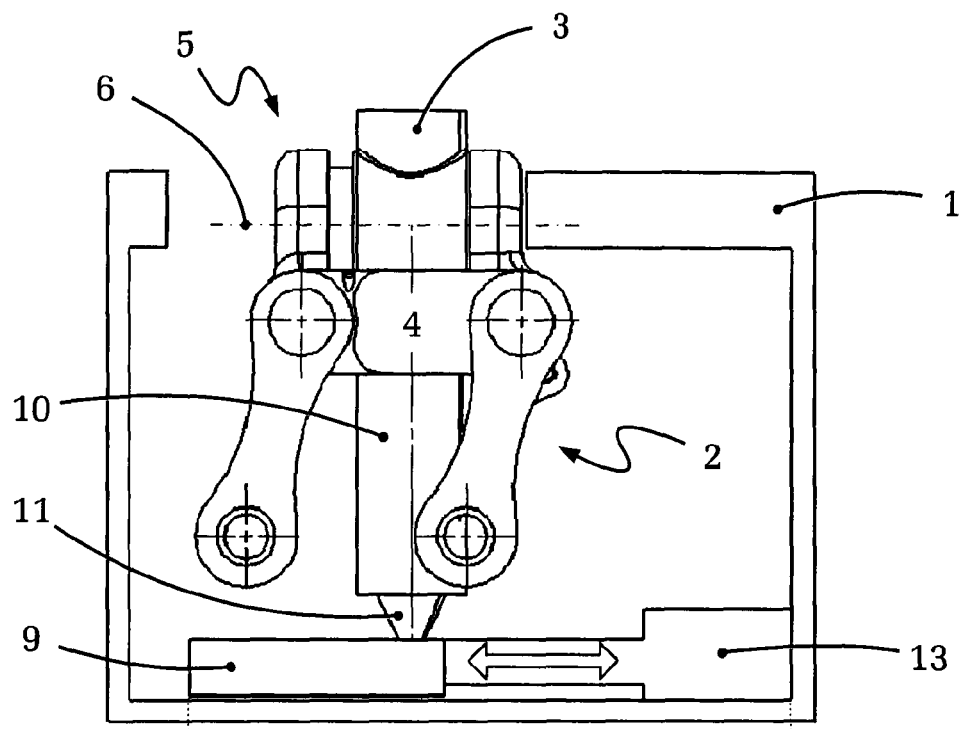
FIG. 1 is a schematic view of an embodiment of an actuating device according to this invention with a displaceable lock-in gate viewed in a direction along the vehicle's direction of travel.

FIG. 1 shows a highly schematic view of an embodiment of an inventive actuating device for a gearbox with a cutaway housing 1, whereby the direction of view runs horizontal along the direction of travel of the associated motor vehicle.

One first recognizes in this actuating device a selector lever guide designed as a four bar linkage mount 2 as well as the only partially visible selector lever 3. The selector lever 3 is connected with the connection element 4 of the four bar linkage mount 2 by means of an additional swivel joint 5, whereby the swivel axis 6 of the swivel joint 5 runs parallel to the surface of the drawing page. The selector lever 3 can thus, thanks to the four bar linkage mount 2, move or swivel to the side, whereby the selector lever 3 moves back and forth between the tip track 7 and a shifting track 8, see FIG. 2 with the shifting tracks 7 and 8 associated with the tip track and the shifting track. Furthermore the selector lever 3 can, thanks to the swivel joint 5, move forward and backward in the direction of travel in order to be able to select the various shift positions or drive gears within the respective shifting tracks 7, 8.

Figure 2:
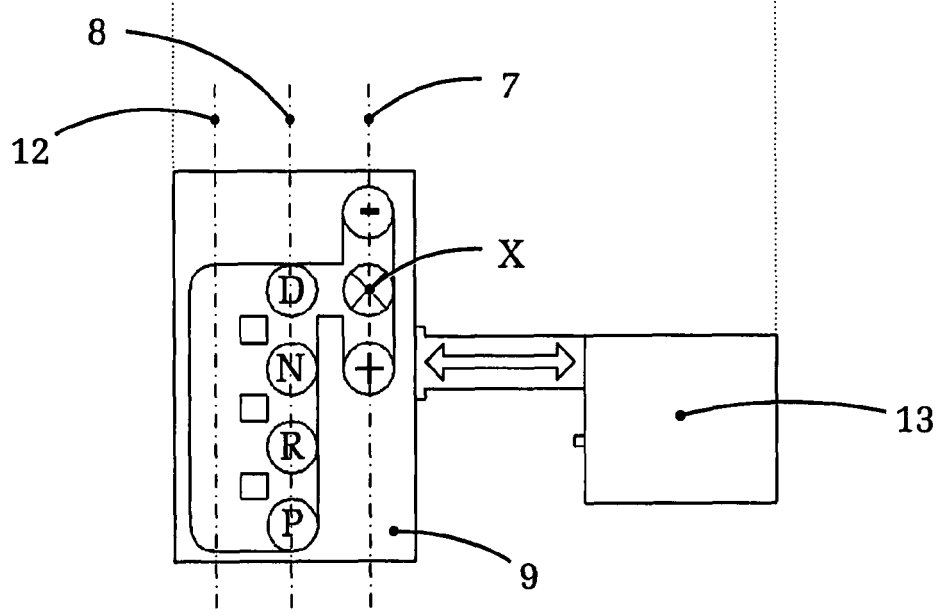
FIG. 2 is a schematic plan view of a lock-in gate and an actuator device of the operating device according to FIG. 1.
Figure 3:
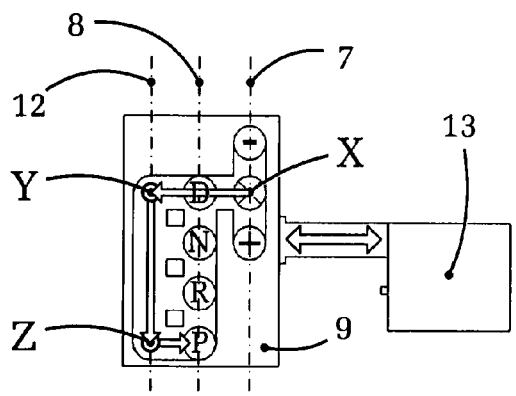
FIG. 3 is again a lock-in gate and actuator device according to FIG. 2 in smaller detail.

Furthermore apparent in FIG. 1, especially when viewed together with FIG. 2, is the arrangement of the lock-in gate 9 and the engagement of the detent pin 10 with the detent pin tip 11 into the lock-in gate 9.

An overhead view of the lock-in gate 9 is shown in FIG. 2. One recognizes that the lock-in gate 9 exhibits several shifting tracks 7, 8 and 12 in which the detent pin tip 11 can glide, whereby the selector lever 3 is again guided into appropriate selector lever positions or can be engaged there. In the embodiment depicted, the lock-in gate 9 comprises a shift track constructed as a shifting track 8 with four recesses P, R, N and D which are associated with four selector lever positions P, R, N, and D. If the selector lever is thus located in the shift track and thus the detent pin tip 11 in the shifting track 8 of the lock-in gate 9, then by means of a manual operation of the selector lever 3 the corresponding four selector lever positions P, R, N, and D can be selected. The detent pin tip 11 thereby travels into the appropriate recess P, N, R and D of the lock-in gate 9 and thus fixes the selector lever 3 in the selected position.

Aside from the shifting track 8, the lock-in gate 9 includes a tip track 7 as well as also a return track 12. The tip track 7 of the lock-in gate 9 is needed, when the selector lever 3 is moved into the corresponding tip track in order undertake there a manually controlled gear shift. The tip track 7 of the lock-in gate 9 has only one locking depression X indicated in the center of the tip track 7, since the selector lever 3 should behave in a mono-stable manner in the tip track 7, namely after an appropriate operation not remaining in the end positions "+" and "−" but instead always returning to the middle position X.

On the other hand, the return track 12 on the lock-in gate 9 positioned on the left in the drawing serves an automatic, actuator-controlled, tracking of the selector lever 3 into the park position, in the event the parking lock is supposed to be automatically set in the transmission by means of the auto-P function. The lock-in gate 9 hereby is allowed to move sideward back and forth in the drawing by means of, for example, the electro-motor actuator 13, so that the detent pin tip 11 is guided into the desired shifting track 7, 8 or 12 of the lock-in gate 9, in particular here the return track 12 of the lock-in gate 9.

Figure 4:
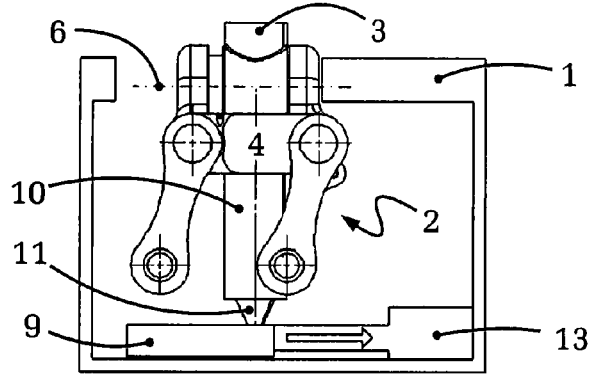
FIG. 4 is a representation and view according to FIG. 1 of the actuating device of FIG. 1 with a selector lever and detent pin in the tip track.
Figure 5:
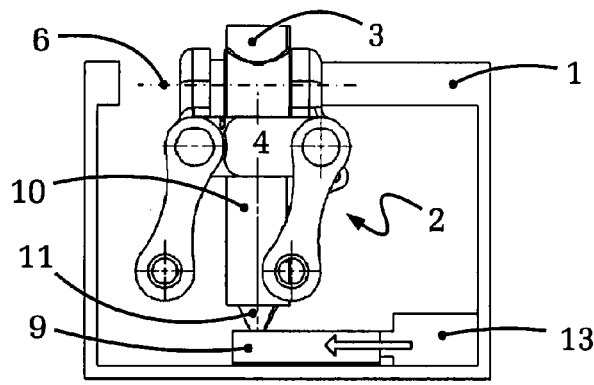
FIG. 5 is a representation and view according to FIGS. 1 and 4 of the actuating device of FIGS. 1 and 4 with a lock-in gate in the return guide.
Figure 6:
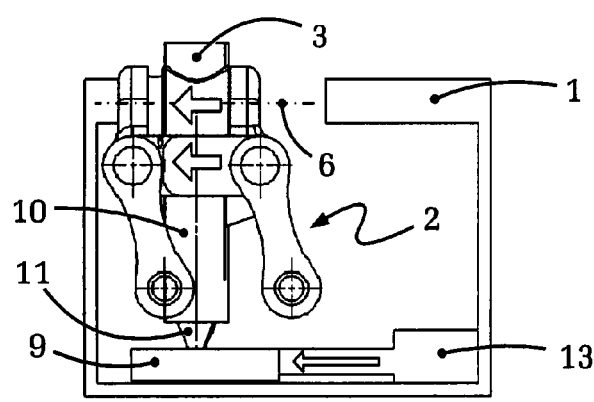
FIG. 6 is a representation and view according to FIGS. 1, 4 and 5 of the actuating device of FIGS. 1, 4 and 5 with a lock-in gate in the shift track position and the selector lever in the park position.

An example of a corresponding sequence of procedures in the actuating device is shown in FIGS. 3 to 6. For an easier overview, FIG. 3 again corresponds to the representation in FIG. 2, while FIGS. 4 to 6 show the corresponding sequential steps during the actuator-caused movement of the lock-in gate 9 and thus also the selector lever 3.

Initially the selector lever 3 is located in the tip track 7, see FIG. 4, and thus the detent pin tip 11 in the tip track 7 at position X of the lock-in gate 9 located on the right of the lock-in gate in the drawing. The driver shuts off and leaves the vehicle with the selector lever 3 in this position. The removal of the ignition key or the leaving of the vehicle is registered by the gearbox control, for which reason the transmission control automatically sets the park lock in the transmission for safety reasons.

Finally the actuator 13 of the actuating device is activated by the transmission control. The actuator 13 displaces the lock-in gate 9 from the position as per FIG. 4 (detent pin tip 11 at Position X in the tip track 7 according to FIG. 3) into the position according to FIG. 5 (detent pin tip 11 at Position Y in the return track 12 according to FIG. 3). In this position of the detent pin tip 11 the lock-in gate 9 opposes the movement of the detent pin tip 11 with only a little resistance, since the return track 12 contains no locking depressions. Therefore the selector lever 10 can now, for example, be guided back easily by means of slight spring force from Position Y to Position Z according to FIG. 3.

After the return movement of the selector lever from Position Y to Position Z, the lock-in gate 9 is again displaced to the left on the drawing by means of the actuator 13 until the situation of FIG. 6 exists. Then next is a one-time displacement of the detent pin tip 11 from Position Z into Position P according to FIG. 3, whereby the detent pin tip 11 enters into the locking depression P of the lock-in gate 9. During the following further movement of the lock-in gate 9 to the left on the drawing, there occurs a catching of the detent pin tip 11 and thus also the selector lever 3, whereupon the selector lever 3 is moved by means of the corresponding movement of the four bar linkage mount 2 back into the shifting track 8, as can be seen in FIG. 6 together with FIG. 3.

An alternative embodiment of the inventive actuating device is shown in FIGS. 7 and 8. The direction of view in the representation runs according to FIGS. 7 and 8 again in the horizontal plane along the direction of travel of the associated vehicle. In the actuating device depicted here, the disengagement device comprises an electro-motor actuator 14 with a toothed gearing 15 and a linear spindle 16 to separate the connection between the detent pin 10 and the lock-in gate 9. In contrast to the embodiment according to FIGS. 1 to 6 the lock-in gate 9 in the embodiment according to FIGS. 7 and 8 is not displaced horizontally but instead more in a vertical manner by the actuator device 14, 15 and 16.

The representation of FIG. 7 thereby corresponds to the operating position of the actuating device in which the detent pin tip 11 is located in normal engagement with the shifting tracks 7, 8 positioned on the lock-in gate 9. The electro-motor actuator 14 is activated for the automatic return of the selector lever 3 from one of the drive gear positions into the park position, whereupon the linear spindle 16 extends downward in the drawing. As a result the lock-in gate 9 connected with the rocker switch 17 via the axis 18 is likewise pushed down in the drawing by the rocker switch 17, whereupon the detent pin tip 11 fell out of contact with the associated shifting tracks 7, 8 of the lock-in gate 9. Finally the selector lever 3 again allows itself to move easily and independently into the park position—for example by means of a spring power impact.

After the selector lever 3 has fallen back into the park position, the electro-motor actuator 14 is activated in a reverse rotational direction, whereupon the linear spindle 16 is again retracted and the lock-in gate 9 is again brought back into the operating position according to FIG. 7 by means of the rocker switch 17.

FIGS. 9 to 13 show another embodiment for an inventive actuating device in an extremely schematic and not-to-scale representation. The direction of travel of the vehicle thereby runs in the horizontal in FIGS. 9 to 11.

In FIG. 9 one first again recognizes a selector lever 3 which is mounted in a ball joint 19 in the housing 1 of the actuating device. The selector lever 3 possesses a spring-loaded detent pin 10 mounted in the selector lever 3, whereby the detent pin 10 again engages into the lock-in gate 9 with the detent pin tip 11. The lock-in gate 9 possesses a number of shifting tracks 7, 8, 12 and 21 (see FIG. 11), whereby the shifting track 8 recognizable as a cutaway in FIG. 9 again is provided with a number of locking depressions P, R, N, D for the selector lever positions P, R, N and D.

Figure 9:
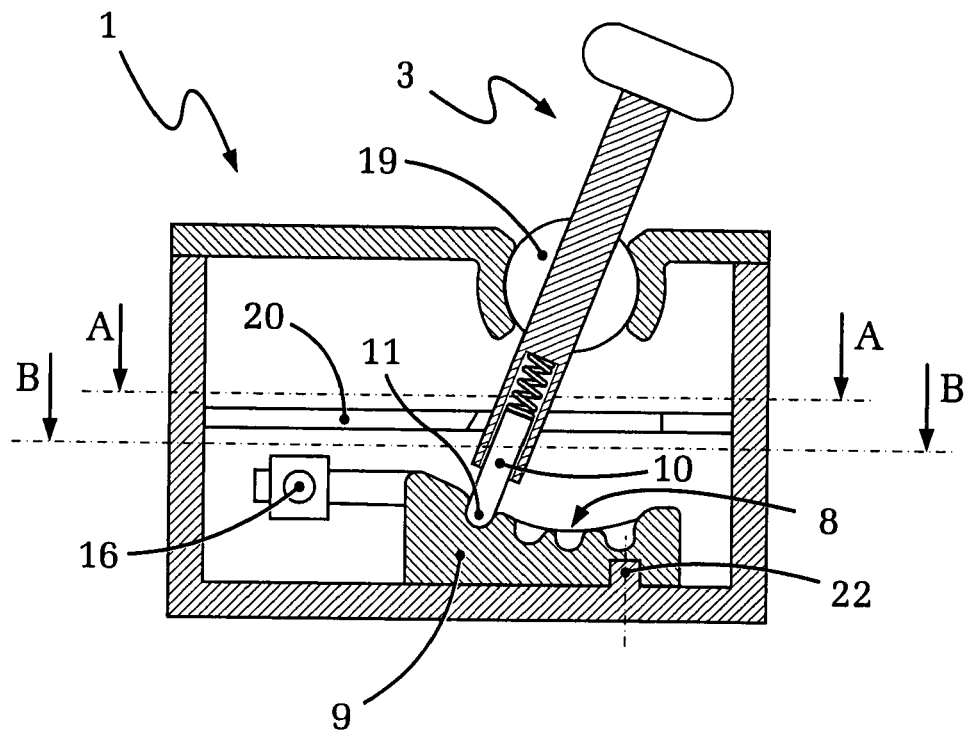
FIG. 9 is a schematic, cutaway view of an embodiment of an inventive actuating device with a lock-in gate that can swivel.
Figure 10:
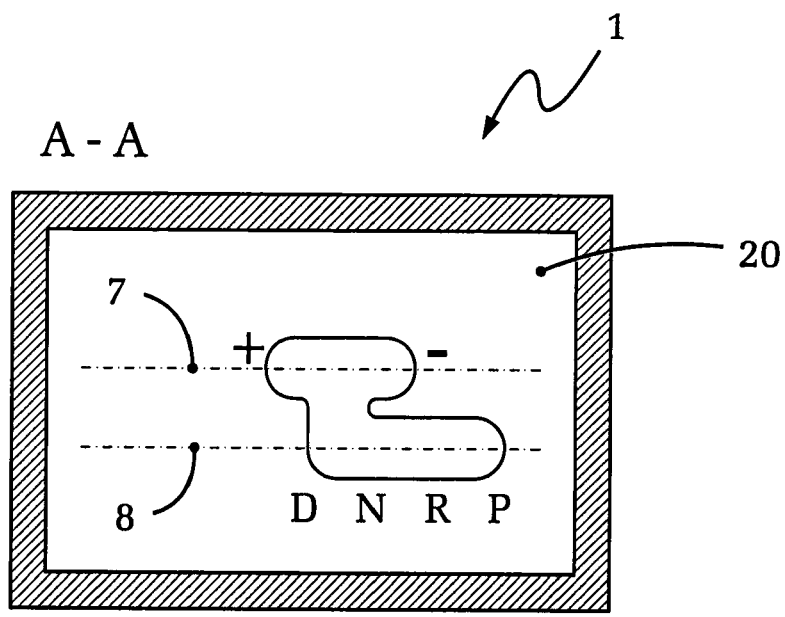
FIG. 10 is a schematic representation of section A-A of FIG. 9 in an overhead view of the sliding block guide.

The actuating device depicted further comprises a selector lever gate 20 as shown in FIG. 10 in a schematic overhead view according the to section A-A in FIG. 9. One recognizes the tip track 7 used for manual gear selection as well as shifting track 8 in which the selector lever positions P, R, N and D can be selected.

Figure 11:
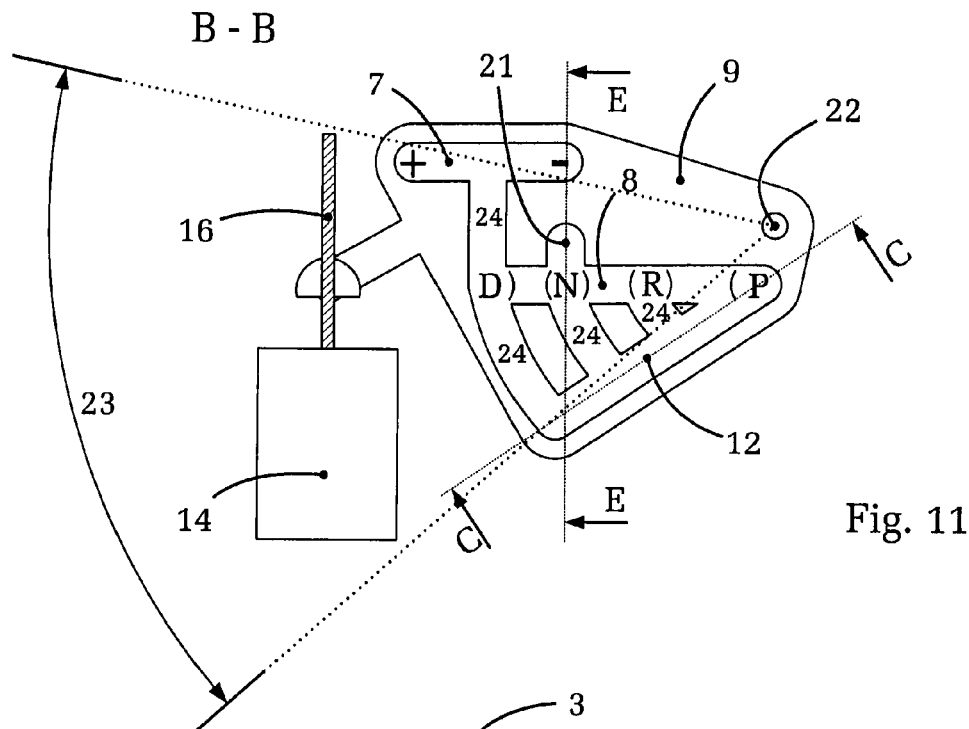
FIG. 11 is a schematic representation of section B-B of FIG. 9 in an overhead view of the Lock-in gate.

An overhead view in FIG. 11 of the section B-B from FIG. 9 shows the lock-in gate 9 with the various shifting tracks 7, 8, 12 and 21 provided for guiding or locking the detent pin tip 11, whereby for a better overview the housing 1 is not shown. One again recognizes a tip track 7 (without locking depressions for the detent pin tip 11, since the selector lever 3 should behave in a mono-stable manner in the tip track 7) in addition, the shifting track 8 with the locking depressions for the selector lever positions P, R, N and D, as well as, positioned at an angle to the shifting track 8, a return track 12 which likewise exhibits no locking depressions. Finally, the lock-in gate 9 also comprises a locking track 21. In the embodiment shown, the locking track 21 is associated with the selector lever position "N" or neutral; there can also be a locking track (not depicted here) especially for the selector lever position "P" or park position.

Figure 12:
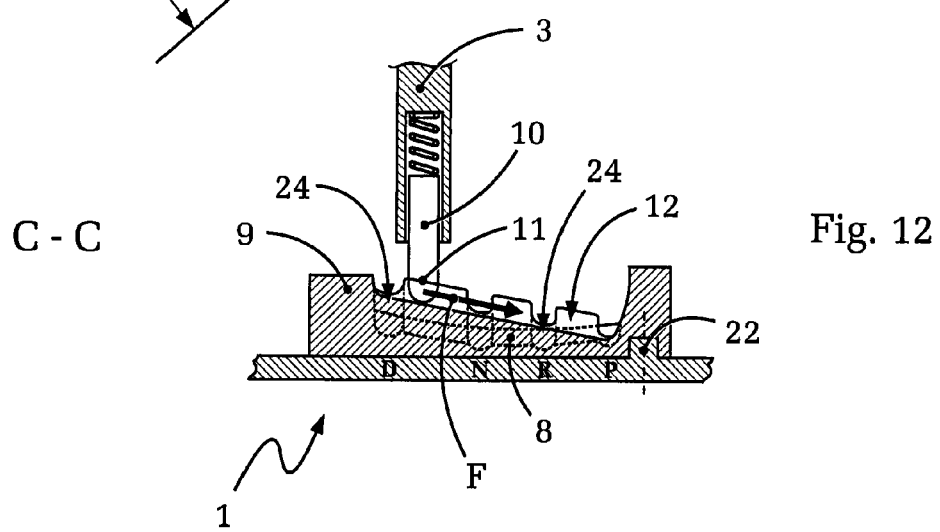
FIG. 12 is a schematic representation of section C-C through the lock-in gate according to FIG. 11.

As can be seen from a comparison of FIG. 11 with FIG. 9 or FIG. 12, the lock-in gate 9 is mounted so as to swivel on a pivot pin 22 with respect to the housing 1 of the actuating device. The drive unit for the actuator-caused swiveling of the lock-in gate 9 around the pivot pin 22 is depicted in FIG. 11 in a highly schematic manner. It thereby involves a servo-motor 14 with a linear spindle 16 which can swivel the lock-in gate 9 back and forth within the swivel angle 23 around the pivot pin 22.

FIG. 12 shows a longitudinal section through the return track 12 of the lock-in gate 9 along the section C-C in FIG. 11. The dashed line means the course of the shifting track 8 located behind the plane of the drawing in the cut-away representation of FIG. 12 with the locking depressions P, R, N and D. It is clearly visible that the return track 12 runs in a gradient in the direction to the park position P. This gradient of the return track 12 serves the actuator-initiated, independent return of the selector lever 3 into the park position.

If the park lock is automatically set in the transmission by the transmission control using the auto-P, whereby the selector lever is left by the driver, however, in a drive gear position or also in tip track 7, then the actuator 14 is supplied with current by the transmission control and the lock-in gate 9 swivels by the (maximum) swivel angle 23 according to FIG. 11. The detent pin tip 11 hereby independently moves from the previously set drive gear—via the transverse connections 24 positioned on the lock-in gate 9 between the tip track 7, shifting track 8 and the return track 12—to the sloping return track 12. Because of the gradient of the return track 12, a downhill-slope force F arises due to the spring-loaded detent pin tip 11 which lets the detent pin 10 and thus the selector lever 3 fall independently into the park position P without any further actuator involvement.

Figure 13:
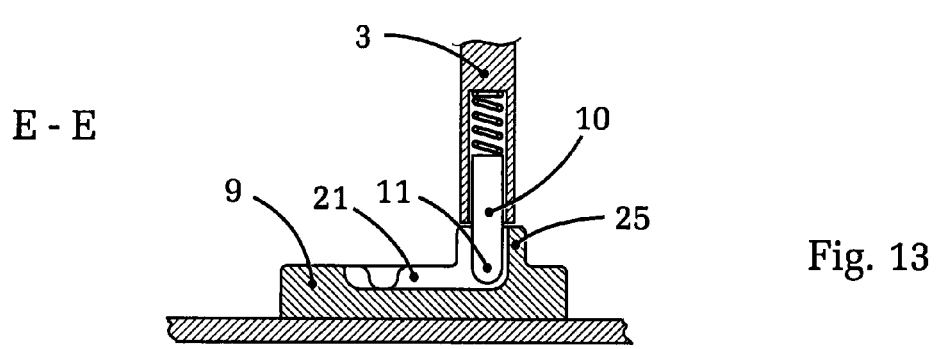
FIG. 13 is a schematic representation of section E-E through the lock-in gate according to FIG. 11.

FIG. 13 shows a cutaway view of the locking track 21 along the section E-E in FIG. 11. The locking track 21 serves to lock the detent pin tip 11 and thus the selector lever 3 in a certain selector lever position, for example, to realize the safety functions Key-lock and/or Shift-lock. The lock-in gate 9 is hereby swiveled downward in the drawing with a suitable selector lever position by means of the servo-actuator 14 and the linear spindle 16 according to FIG. 11, whereupon the index in tip 11 moves into the position shown in FIG. 13 in the locking track 21 of the lock-in gate 9. The locking track 21 is provided with a collar 25 for secure locking, so that the detent pin 10 can not jump out of the locking track 21 upon the application of force on the selector lever 3.

In the end, it becomes clear that an actuating device for a motor vehicle transmission is created with the invention which has the advantage with respect to the state of the art that it always indicates the actual shift status of the transmission in agreement with the selector lever position, whereby the actuator to return the selector lever can be constructed simply, robustly and thus cost effectively. Furthermore thanks to the invention, it can be ensured that the selector lever can be returned into the park position safely from any desired position. In this way the invention facilitates an optic as well as tactile feedback to the driver about the actual shift condition of the transmission, in particular in the case of the automatically engaged park lock by means of "auto-P".

Thanks to the cost effective realization and reliability, the invention makes a significant contribution to ergonomics and safety with the actuating device for motor vehicles, in particular for use in the area of automatic transmissions.

LIST OF REFERENCE NUMBERS

1 Housing
2 Four bar linkage mount
3 Selector lever
4 Connection element
5 Swivel joint
6 Swivel axis
7 Tip track
8 Shifting track
9 Lock-in gate
10 Detent pin
11 Detent pin tip
12 Return track
13, 14 Actuator
15 Transmission
16 Linear spindle
17 Rocker switch
18 Axis
19 Ball joint
20 Selector lever gate
21 Locking track
22 Pivot pin
23 Swivel angle
24 Transverse connection
25 Collar

The invention claimed is:

1. An operating device for selecting shift stages in a shift-by-wire gearbox, the operating device comprising:
a selector lever (3) being movable between at least one drive gear position and a park position with stable selector lever positions as well as a locking device with a spring-loaded detent pin (10) and a lock-in gate (9), an actuator device for actuator-induced movement of the selector lever (3), the actuator device comprising an actuator-powered disengagement device (13) whereby the detent pin (10) and the lock-in gate (9) are biased, via the disengagement device (13), from a first relative position, in which the detent pin (10) engages in a shifting track (8) of the lock-in gate (9), into another relative position, in which the detent pin (10) disengages the shifting track (8); and the disengagement device (13) being a device which causes actuator-induced movement of the lock-in gate (9) relative to a housing base (1) of the operating device;

wherein the lock-in gate (9) has a return track (12), and the shifting track (8) and the return track (12) intersect with one another, at the park position, and extend at an acute angle, with respect to one another, from the park position.

2. The operating device according to claim 1, wherein the disengagement device (13) is arranged for biasing the lock-in gate (9) in a direction normal to a direction of a spring force of the detent pin (10).

3. The operating device according to claim 1, wherein the return track (12) lies in an inclined plane with a gradient in a direction toward the park position.

4. The operating device according to claim 1, wherein the lock-in gate (9) is movable back and forth, via the disengagement device (13), between an operating position and a return position.

5. The operating device according to claim 1, wherein the lock-in gate (9) is biased back and forth, via the disengagement device (13), between an operating position and a return position.

6. The operating device according to claim 5, wherein the locking track (21) is a branch of the shifting track (8).

7. The operating device according to claim 1, wherein the lock-in gate (9) has a locking track (21) for accommodating locking of the detent pin (10).

8. The operating device according to claim 1, wherein the disengagement device comprises an actuator-movable sliding block guide for the selector lever.

9. An operating device for selecting shift stages in a shift-by-wire gearbox, the operating device comprising:

a selector lever (3) being movable between at least one drive gear position and a park position with stable selector lever positions as well as a locking device with a spring-loaded detent pin (10) and a lock-in gate (9);

an actuator device for actuator-induced movement of the selector lever (3), the actuator device comprising an actuator-powered disengagement device (13) whereby the detent pin (10) and the lock-in gate (9) are biased, via the disengagement device (13), from a first relative position, in which the detent pin (10) engages in a shifting track (8) of the lock-in gate (9), into another relative position, in which the detent pin (10) disengages from the shifting track (8); and the disengagement device (13) being a device which causes actuator-induced movement of the lock-in gate (9) relative to a housing base (1) of the operating device;

wherein the lock-in gate (9) has a return track (12) which facilitates returning the detent pin (10) back into the park position, the shifting track (8) and the return track (12) intersect one another at the park position and extend, from the park position, at an acute angle with respect to one another.

10. An operating device for selecting shift stages in a shift-by-wire gearbox, the operating device comprising:

a selector lever (3) being movable between at least one drive gear position and a park position with stable selector lever positions as well as a locking device with a spring-loaded detent pin (10) and a lock-in gate (9);

an actuator device for actuator-induced movement of the selector lever (3), the actuator device comprising an actuator-powered disengagement device (13) whereby the detent pin (10) and the lock-in gate (9) are biased, via the disengagement device (13), from a first relative position, in which the detent pin (10) engages in a shifting track (8) of the lock-in gate (9), into another relative position, in which the detent pin (10) disengages from the shifting track (8); and the disengagement device (13) being a device which causes actuator-induced movement of the lock-in gate (9) relative to a housing base (1) of the operating device;

wherein the lock-in gate (9) has a return track (12), and a plurality of defined transverse connections (24), which provide passage for the detent pin (10), connect the shifting track (8) with the return track (12).

11. The operating device according to claim 10, wherein both the shifting track (8) and the return track (12) diverge from one another.

* * * * *